Dec. 2, 1930.  D. D. MAURER  1,783,513
TRANSMISSION
Filed Sept. 6, 1929  2 Sheets-Sheet 1

D.D.Maurer
INVENTOR
BY Victor J. Evans
ATTORNEY

Dec. 2, 1930.  D. D. MAURER  1,783,513
TRANSMISSION
Filed Sept. 6, 1929  2 Sheets-Sheet 2

D. D. Maurer
INVENTOR
BY Victor J. Evans
ATTORNEY

Patented Dec. 2, 1930

1,783,513

UNITED STATES PATENT OFFICE

DONALD D. MAURER, OF WALNUT CREEK, CALIFORNIA

TRANSMISSION

Application filed September 6, 1929. Serial No. 390,801.

This invention relates to a fluid transmission device, the general object of the invention being to provide fluid operated clutches for driving a driven shaft from a drive shaft at a number of forward speeds and at a reverse speed, the first speed clutch being in the form of a disk clutch so as to provide a certain amount of slippage and the other clutches being positive ones to prevent slippage, all the clutches being operated by fluid pressure, with means for manually controlling the flow of fluid to the clutches.

Another object of the invention is to so form the positive clutches and the reverse clutch that the parts are held in inactive position through the action of centrifugal force.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1:
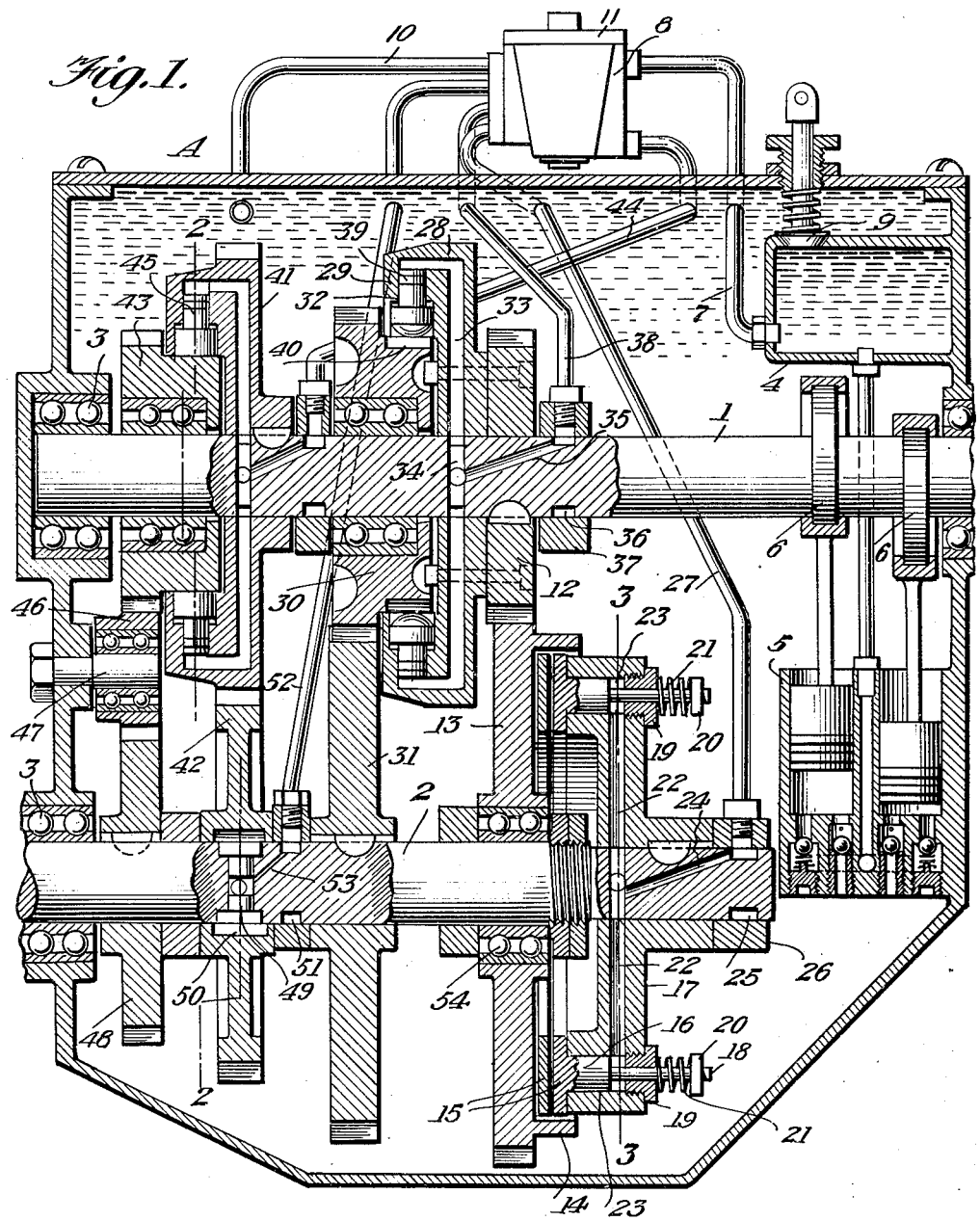
Figure 1 is a sectional view showing one manner of carrying out the invention.
Figure 2:
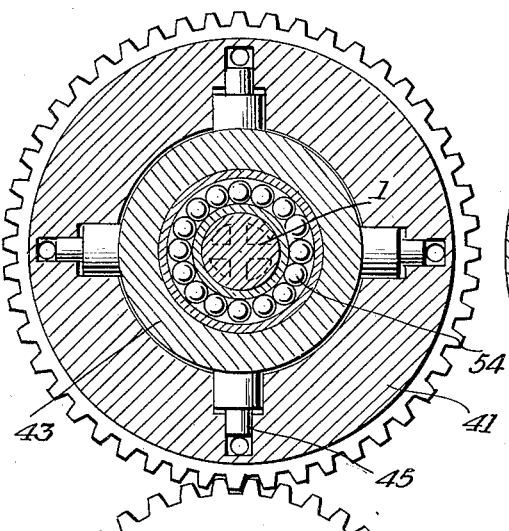
Figure 2 is a section on line 2—2 of Figure 1.
Figure 3:
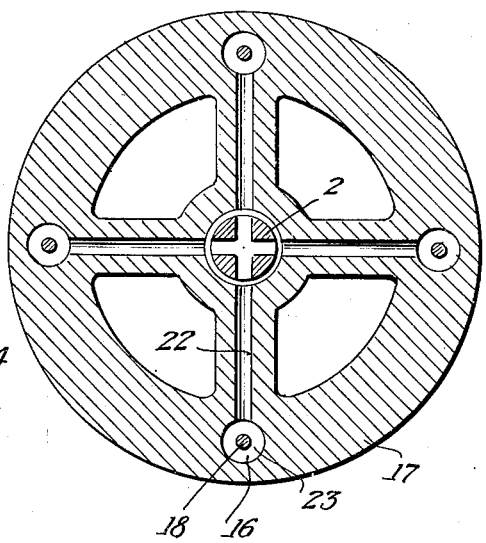
Figure 3 is a section on line 3—3 of Figure 1.
Figure 3:
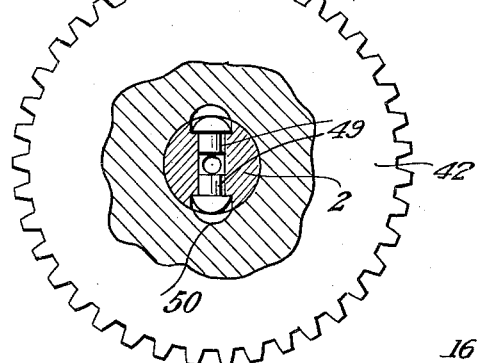
Figure 4:
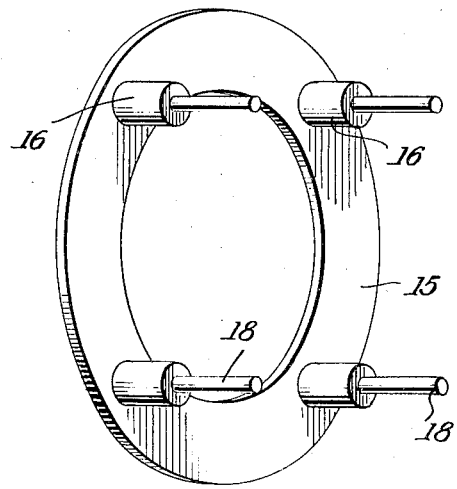
Figure 4 is a perspective view of one of the clutches.

In these drawings, the letter A indicates a housing, which is made fluid-tight, and which contains oil or any other suitable fluid, and 1 indicates a drive shaft extending through one end of the housing and suitably journaled therein and 2 indicates a driven shaft extending into the housing from the opposite end and suitably journaled therein. Anti-friction bearings 3 are provided for the shafts.

A small tank 4 is arranged in the housing and fluid from the housing is pumped therein by the pump 5, the pistons of which are operated by cams 6 on the drive shaft 1, and this tank is connected by a pipe 7 with a valve casing 8 and the tank has an opening in its top communicating with the interior of the housing and normally closed by a spring pressed valve 9 which is connected to a pedal or the like so that it can be operated to open position, when desired. A plurality of pipes is connected with the valve casing and one of these pipes 10 connects the casing with the housing so that when the valve 11 is turned to a certain position, the fluid from the tank will pass through the valve into the pipe 10 and then pass back into the housing or if the valve 9 is raised, the fluid will flow from the tank directly into the housing. The pump, the tank and the valves 9 and 11, with the casing 8, are substantially the same as shown and described in my Patent No. 1,731,076, dated October 8, 1929, so that it is not thought necessary to describe these parts in detail.

A gear 12 is keyed to the shaft 1 and meshes with a gear 13 loosely arranged on the shaft 2, the gear 13 having a flange 14 which forms a space for receiving the clutch disks 15, the outer one of these disks being formed with the bosses 16 on its outer face which are slidably arranged in openings formed in a wheel 17 keyed to the shaft 2, each boss having a stem 18 thereon which passes through a nut 19 closing the outer end of each opening in the wheel 17, and the extremity of each stem 18 has a collar 20 thereon between which and the nut is placed a spring 21 which encircles the stem. Thus the springs act to hold the clutch disks in releasing position. The wheel 17 is formed with the radiating passages 22 which communicate with the openings 23 and the inner ends of these passages 22 are in communication with a passage 24 in the shaft 2, the outer end of which is in communication with an annular groove 25 in said shaft which is covered by a collar 26 on the shaft. A pipe 27 has one end threaded in the collar and is in communication with the groove 25 and the other end of the pipe is in communication with the valve casing 8. Thus when the valve 11 is moved to a position to place the pipe 7 in communication with the pipe 27, fluid from the tank 4 will flow through the passages 24 and 22 into the openings 23 and act on the bosses 16 and thus cause one of the disks 15 to press the other disk against the gear 13 so that said gear will be connected with the shaft 2 by the clutch means described and thus the shaft 2 will be driven from the shaft 1 at a reduced speed. By using the disk type of clutch, a certain amount of slippage is permitted, which is desirable when the motor starts to pick up the load on the first speed.

A wheel 28 is bolted to the gear 12 and has an annular enlargement 29 on its outer face which forms a space for receiving a part of a gear 30 rotatably arranged on the shaft 1 and having its teeth meshing with the teeth of a gear 31 keyed to the shaft 2. The enlargement is formed with a plurality of cylinder forming openings 32 which open out through the inner edge of the enlargement, with the inner ends of the openings of greater diameter than their outer ends and passages 33 formed in the wheel 28, connect these small ends of the openings 32 with the radiating passages 34 in the shaft 1. A passage 35 in said shaft connects the passages 34 with an annular groove 36 covered by a collar 37 and a pipe 38 has one end threaded in the collar and in communication with the groove and its other end is in communication with a port in the valve casing 8. A piston 39, of two diameters, is arranged in each cylinder forming opening 32, with its large diameter or head part of arcuate shape to engage one of a number of arcuate shaped recesses 40 in that portion of the gear 30 which fits in the space formed by the enlargement 29. Thus when the valve 11 is turned to place the pipe 38 in communication with the pipe 7, the fluid from the tank 4 will pass through the pipes and the passages 33, 34 and 35 and act against the pistons 39 to force these pistons toward the shaft 1 and thus cause the heads of the pistons to engage the recesses 40 so that the gear 30 will be locked to the wheel 28 which is fastened to the gear 12, so that the gear 30 will rotate with the shaft 1 and thus drive the shaft 2 through means of the gear 31 so that the shaft 2 will be driven at its second speed from the shaft 1. When the valve 14 closes communication between the pipe 38 and the pipe 7, and the pressure of fluid is removed from the pistons 39, these pistons will return to inactive position through the action of centrifugal force and thus the gear 30 will not rotate with the shaft. A gear 41 is keyed to the shaft 1 and meshes with a gear 42 loosely arranged on the shaft 2. This gear 41 is constructed similar to the wheel 28, with its enlargement forming a space for receiving portion of a gear 43 rotatably arranged on the shaft 1, so that when compressed fluid is supplied to the passages of this gear 41 through the pipe 44 which is connected with the valve casing 8, the pistons 45 of said gear 41 will frictionally engage that part of the gear 43 which is enclosed by the enlargement of the gear 41 and thus said gear 43 will be caused to move with the gear 41. The gear 43 meshes with an idler gear 46 carried by a stub shaft 47 journaled in the housing and said idler gear meshes with a reversing gear 48 keyed to the shaft 2. Thus when fluid pressure is applied to the pistons 45 of the wheel 41, the shaft 2 will be driven at reverse speed by the shaft 1. As the pistons 45 frictionally engage the gears 43, a certain amount of slippage is provided for the reverse means.

The gear 42 is locked to the shaft 2 by fluid pressure means when said shaft is being driven at high or the third speed from the shaft 1, such means comprising a number of pistons 49 arranged in the shaft 2 and when forced outwardly, engaging receses 50 in the hub of the gear 42. These pistons are forced outwardly by fluid from the valve casing 8 entering an annular groove 51 formed in the shaft 2 from a pipe 52 connected with the valve casing and from the groove, the fluid passes through a port 53 into the central part of the opening in shaft 2 which contains the pistons.

All those gears which are rotatably supported on their shafts, with the exception of gear 42, are provided with the ball bearings 54.

From the foregoing it will be seen that at the starting of the drive of shaft 2 from shaft 1, the clutch disks are moved to operative position by the fluid pressure means so that shaft 2 is driven from shaft 1 through the gear 12 and the gear 13. Then the valve 11 is adjusted to cause the shaft 1 to drive the shaft 2 through means of the gear 12, its wheel 28 and gears 30 and 31 which is the second speed. The valve 11 is then adjusted to supply fluid pressure to the pistons 49 so as to lock the gear 42 to the shaft 2 and then the shaft 2 will be driven through this gear and the gear 41. The reverse speed is secured by adjusting the valve 11 to cause the fluid to act on the cylinders 45 of the gear 41, so that the gear 43 is frictionally engaged with the gear 41 and thus the shaft 2 is driven in a reverse direction from the shaft 1 through the gears 43, 46 and 48. When the pistons are in inoperative position, they will be held out of contact with the parts so that there will be no friction between the drive gears and the driven gears and the use of anti-friction means for the gears which are rotatably mounted on the shafts will further reduce friction.

It is though from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A transmission of the class described comprising a drive shaft, a driven shaft, a small gear keyed to the drive shaft, a large gear rotatably arranged on the driven shaft and meshing with the small gear, fluid operated means for connecting the rotatably arranged gear with its shaft, such means including clutch disks, a second gear keyed to the driven shaft, a gear rotatably arranged on the drive shaft and meshing therewith, a piston carrying member connected with the first gear on the drive shaft and the rotatably arranged gear on the drive shaft having recesses in a part thereof for receiving the pistons, fluid pressure means for cauing the pistons to engage the recesses to lock the two gears together, a second piston carrying member keyed to the drive shaft and having teeth thereon, a gear rotatably arranged on the driven shaft and having its teeth meshing with the teeth on said member, fluid pressure means for connecting the last mentioned gear on the driven shaft with said shaft, a gear rotatably arranged on the drive shaft and having a part thereof frictionally receiving the pistons of the toothed member, fluid pressure means for causing said pistons to engage said part, a reverse gear keyed on the driven shaft and an idler gear meshing therewith and with the gear associated with the toothed member on the drive shaft.

In testimony whereof I affix my signature.

DONALD D. MAURER.